March 14, 1961
A. E. BROWN ET AL
2,974,641
HYDRAULIC DIFFERENTIATOR
Filed March 16, 1959
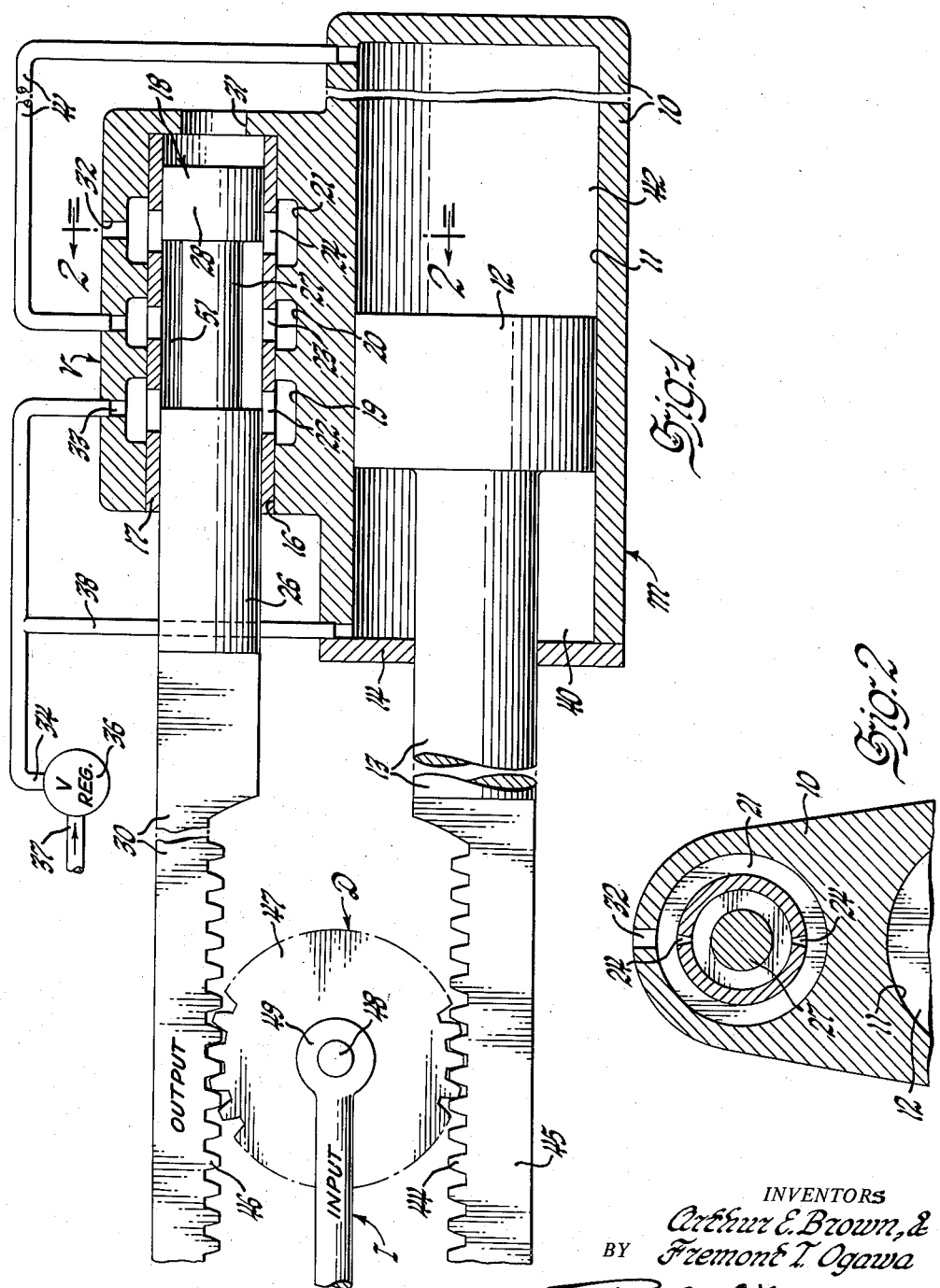
INVENTORS
Arthur E. Brown, &
BY Fremont T. Ogawa
Paul Fitzpatrick
ATTORNEY

2,974,641
HYDRAULIC DIFFERENTIATOR

Arthur E. Brown and Fremont T. Ogawa, Milwaukee, Wis., assignors to General Motors Corporation, Detroit, Mich., a corporation of Delaware Filed Mar. 16, 1959, Ser. No. 799,792

5 Claims. (Cl. 121—41)

Our invention is directed to a differentiating device or mechanism, and particularly to a hydraulic differentiator. While there are many devices which determine in one way or another the derivative of a variable with respect to time, we are not aware of any similar to that disclosed herein. The differentiator of this invention is of a nature particularly suited to certain types of applications, such as fuel controls and governors for engines.

In gas turbine fuel controls, for example, the displacement of a movable member may be proportional to a quantity such as engine speed or engine fuel flow. Means for deriving engine acceleration or rate of change of fuel flow may be needed for use in the control. Our differentiator may have its input coupled to a member movable according to engine speed, in which case its output will be engine acceleration. Since the differentiator is a hydraulic device, it is particularly well suited to use in fuel controls and governors. It may be operated by servo fuel or servo oil which is present in most such devices. Moreover, our differentiator is exceedingly simple and compact, facilitating its incorporation in control mechanisms.

The principal objects of our invention are to provide a compact and accurate differentiator, one in which the input and output are displacements of movable members, and one adapted to operation by fluid under pressure.

The nature and advantages of the invention will be apparent from the succeeding detailed description of the preferred embodiment thereof and the accompanying drawings thereof, in which:

Figure 1 is a somewhat schematic drawing of a differentiator with parts in section.

Figure 2 is a partial transverse sectional view taken on the plane indicated by the line 2—2 in Figure 1.

By way of introduction to the detailed description, it may be stated that the differentiator embodies a hydraulic motor, a servo valve controlling the motor, an input member differentially coupled to the motor and the valve, and an output member moving with the valve. The structure may be generally similar to that of certain hydraulic servomechanisms or follow-up devices, except for the critical distinction that the output is valve movement rather than motor movement.

Referring now to Figures 1 and 2, the differentiator illustrated comprises a hydraulic motor M, a servo valve V, and differential means D interconnecting the motor, the valve, and an input member I. The device comprises a body or housing 10 bored to define the cylinder 11 of the motor, within which a differential piston 12 integral with a stem 13 is reciprocable. Stem 13 extends through a cylinder head 14 suitably fixed to body 10. In the simplest case, which will be described, the cross-sectional area of stem 13 is half that of piston 12.

The servo valve V is mounted in a bore 16 in the body. It comprises a ported sleeve 17 which may be pressed into bore 16, in which is reciprocable a valve spool 18. Recesses 19, 20, and 21 in the bore 16 communicate respectively with inlet ports 22, outlet ports 23, and discharge ports 24 machined in the sleeve 17. The valve spool 18 comprises a land 26 which throttles ports 22, a reduced section 27, and a land 28 which throttles ports 24. The valve spool is integral with a stem 30 which is the output member of the device. A port 31 vents the right end of the valve chamber to ambient pressure so that the valve is hydraulically balanced. Discharge ports 24 are also vented to ambient pressure through recess 21 and an outlet 32 in the body.

Ports 22 are connected through recess 19, an inlet 33 in the body, and a conduit 34 to a pressure regulating valve 36 supplied with servo fluid from any suitable source through a conduit 37. The function of valve 36 is to supply actuating fluid to the differentiator at a predetermined, normally fixed, pressure, since variations in pressure affect the calibration of the device. Valve 36 supplies fluid at a fixed pressure above ambient, which we may assume for illustrative purposes to be 100 p.s.i. The fluid preferably is a liquid, since compressibility effects are undesirable. A liquid of low viscosity is preferable. Ordinary aircraft gas turbine fuel, suitably filtered, is quit satisfactory. If outlets 31 and 32 discharge to any pressure other than ambient, valve 36 should be referenced to this discharge pressure so that the total pressure drop from line 34 to outlet 32 is held constant or otherwise controlled as desired. For the present, let it be assumed valve 36 maintains a constant 100 p.s.i. pressure drop across the differentiator.

Liquid also is supplied by valve 36 through branch conduit 38 to the chamber 40 in the stem end of the cylinder, which may be referred to as the small end. Outlet ports 23 of the valve V are connected through recess 20 and conduit 41 to the chamber 42 in the large end of the cylinder. Ports 23 should be large, so as to minimize flow resistance. There may be several circular ports.

Ports 22 and 24, which are throttling ports, should be small so as to avoid unnecessary waste of servo fluid under pressure through ports 22 and 24 in series to discharge outlet 32. Flow through these ports should vary linearly with displacement of the valve spool to provide a linear output from the differentiator. The ports should be narrow circumferentially of the sleeve, since the scale of the output decreases with width of the ports. For these reasons, ports 22 and 24 are narrow slits extending axially of sleeve 17, as indicated in Figures 1 and 2. To balance lateral pressure effects on the spool, two ports are located 180° apart.

The differential mechanism D interconnecting input member I, piston stem 13, and output member 30 may be of any suitable type. As illustrated in Figure 1, rack teeth 44 are cut in a portion 45 of stem 13 which remains outside the cylinder. The output member 30, which may be integral with valve spool 18 and may be rectangular, bears rack teeth 46. A gear 47, shown as a simple gear, but which should be of an anti-backlash type, meshes with racks 44 and 46. Gear 47 rotates freely on a shaft 48 mounted in the end 49 of input member I. With this particular differential mechanism, displacement of input member I must always equal half the sum of the displacements of members 30 and 45.

Since displacement of the valve spool is slight, the cylinder 11, stem 13, and rack 44 must be long enough for these members to travel twice the maximum stroke of input member I. The racks 44 and 46 must be of a length at least equal to the stroke of member I.

Suitable guide bearings (not illustrated) may be provided if desired for members I, 30, and 45.

Operation

In analyzing the operation of the device, such disturbing factors as inertia, friction, and leakage will be ignored. They are of minor importance, and analogous effects are generally present in servomechanisms and computers. Such factors become significant principally by causing errors in the output which may reach undesirable magnitudes at high speeds of operation. In effect, they limit the usable frequency of oscillation of the input. Bearing in mind that the device illustrated in Figure 1 is so constructed that the partial differentials of valve movement and of piston movement with respect to input movement are equal, the effective area of the small side of the piston is half that of the large side, and the pressure in line 34 is held to 100 p.s.i. over the discharge pressure, we may proceed to describe the operation of the device.

Pressure in chamber 42 will equal 50 p.s.i. to balance the forces on piston 12, and this pressure will also be present in space 51 between the lands of the valve spool. Therefore, the pressure drops across ports 22 and 24 will be constant at 50 p.s.i. The flow through these ports will be proportional to the port areas. With no movement of the input and the device stabilized, all parts will be at rest. The valve spool will be centered so that the areas of ports 22 and 24 will be equal. Flow out of port 32 will equal flow into port 33, and there will be no flow to or from cylinder 10.

Now if we assume input member I begins to move at some constant rate (to the right in Figure 1, for example), gear 47 will roll on rack 44 and, through rack 46, will move valve spool 18 to the right. This throttles ports 22 and opens ports 24. The net flow will be outward from chamber 42, and piston 12 will move to the right. The system will again stabilize with piston 12 moving twice as fast as the input member, and spool 18 displaced to the right a constant amount providing the requisite difference between flow through ports 22 and 24. Since flow through each of ports 22 and 24 is a linear function of valve displacement, the net flow to or from chamber 42 is likewise a linear function of valve displacement. From this, it is apparent that the velocity of piston 12 is directly proportional to valve displacement, or, expressed inversely, the displacement of the valve spool is directly proportional to the velocity of the piston, and therefore to that of the input member. Therefore, the displacement of output member 30 represents, to some scale, the velocity of the input member, and the device is a differentiator.

It will be noted that accurate differentiation requires that valve spool displacement be small, since displacement of the valve spool introduces an error into the relation between input and output during transients. Valve spool displacement does not cause an error in the ultimate stabilized value of the output after a step change in input rate.

Upon a decrease in the input, member I moves to the left, and valve 18 moves to the left to supply fluid to chamber 42. In this case leftward displacement of member 30 is proportional to leftward velocity of the input.

It may be noted that lands 26 and 28 have considerable underlap on ports 22 and 24. There is always a flow through the valve. These lands never completely move off the ports, since linearity would be lost in this case. The acceptable velocity of the input member is limited by the porting. The acceptable range of the input is limited by the stroke of the piston. This particular limitation can be avoided by using a rotary motor.

For many applications, the limitations referred to above with respect to the illustrated embodiment are not disadvantageous. For example, input member I may be moved (by some known mechanism) to represent speed or fuel flow of a gas turbine. These values have definite upper limits, and their rate of change is limited.

The dimensions of an exemplary model of the device may be cited to illustrate its compactness. The area of the cylinder is 0.242 sq. in. (diameter about 9/16 in.), the valve spool diameter is 0.25 in., ports 22 and 24 are 0.07 in. in axial length and 0.01 in. in circumferential width, and valve underlap is 0.0623 in.

For a maximum input stroke of one inch (piston stroke two inches), the maximum input velocity is 0.47 in./sec. As will be seen, this permits full stroke travel of the input in a little over two seconds. The displacement of the output member is 0.005 inch at the maximum rate of travel of the input. The small magnitude of the output will require a motion-multiplying device or sensitive transducer of some sort connected to the output for some uses, but not for all.

The characteristics of the differentiator may, of course, be varied by changes in physical proportions. For example, enlarging the cylinder bore increases the output proportionally to the increase in piston area, at the expense of the maximum input speed. Narrowing the valve ports has a similar effect, but since the width is 0.01 inch in the example, this is difficult.

An increase of output travel may be arrived at by a motion reducing connection between the output and the valve. For example, if the valve stem 26 has a threaded connection to the housing 10 and the valve is adjusted by rotating the stem through some such mechanism as a rack on the output member meshing with a pinion on the stem, the motion of the output member may be quite considerable for a given axial travel of the valve spool.

It will be understood that the particular type of valve and cylinder mechanism and the particular differential means illustrated are merely examples of mechanisms of these types which are considered particularly suitable for the practice of the invention. Various types of valves and motors may be employed. The differential means may be of any suitable type, such, for example, as a floating link connecting the input, the piston rod 45, and the output.

Modulation of the output scale of the differentiator may be achieved by varying the pressure in line 34 through suitable control of the regulating valve 36.

In general, any appropriate servomechanism may be employed embodying the principles of the invention; the basic principle of which is that the output is measured by the movement of a control member which controls the speed of a motor and that the movement of the control member, the motor, and the input are differentially related to each other by any suitable differential means.

The detailed description of the preferred embodiment of the invention for the purpose of illustrating the principles thereof is not to be considered as limiting or restricting the invention, since many modifications may be made and alternative structures employed by the exercise of skill in the art within the principles of the invention.

We claim:

1. A differentiator comprising, in combination, an input member, an output member, a motor including a motor member moved by the motor, differential means connecting the input member, the output member, and the motor member, means for energizing the motor, a control means connected between the energizing means and the motor, the control means including a movable member and being correlated with the motor characteristics so that the speed of the motor member is a linear function of displacement of the movable member, and means connecting the output member to the movable member for movement therewith, the displacement of the output member being proportional to the derivative with respect to time of the displacement of the input member.

2. A hydraulic differentiator comprising, in combination, an input member, an output member, a hydraulic motor including a motor member moved by the motor, differential means connecting the input member, the output member, and the motor member, means for supplying a fluid under a controlled pressure, a servo valve connected between the supplying means and the motor, the valve including a movable valve member and a fixed valve member and defining porting controlled by relative movement of the valve members so configured that the rate of movement of the motor is a linear function of displacement of the movable valve member, and means connecting the output member to the movable valve member for movement therewith, the displacement of the output member being proportional to the derivative with respect to time of the displacement of the input member.

3. A hydraulic differentiator comprising, in combination, an input member, an output member, a hydraulic motor including a motor member moved by the motor, differential means connecting the input member, the output member, and the motor member, means for supplying a fluid under a controlled pressure, a servo valve connected between the supplying means and the motor, the valve including a movable valve member and a fixed valve member and defining porting controlled by relative movement of the valve members so configured that flow of fluid through the valve to the motor is a linear function of displacement of the movable valve member, and means connecting the output member to the movable valve member for movement therewith, the displacement of the output member being proportional to the derivative with respect to time of the displacement of the input member.

4. A hydraulic differentiator comprising, in combination, a cylinder, a piston reciprocable therein, a stem fixed to the piston extending through one end of the cylinder, a servo valve including a body fixed relative to the cylinder and a spool reciprocable in the body, the body defining an inlet port, a discharge port, and an outlet port intermediate the other two said ports, the spool including lands disposed to vary progressively the areas of the inlet and discharge ports linearly and in opposite sense, means for supplying fluid under controlled pressure, conduits connecting the supplying means to the inlet port and to the stem end of the cylinder, a conduit connecting the outlet port to the other end of the cylinder, the discharge port being vented, an input member, differential means connecting the input member to the piston stem and the valve spool such that movement of the input member equals a constant times movement of the stem plus a constant times movement of the spool, and an output member connected to and moving with the valve spool.

5. A hydraulic differentiator comprising, in combination, a cylinder, a piston reciprocable therein, a stem fixed to the piston extending through one end of the cylinder, the cross-sectional area of the stem being half that of the piston, a servo valve including a body fixed relative to the cylinder and a spool reciprocable in the body, the body defining an inlet port, a discharge port, and an outlet port intermediate the other two said ports, the spool including lands disposed to vary progressively the areas of the inlet and discharge ports linearly and in opposite sense, means for supplying fluid under controlled pressure, conduits connecting the supplying means to the inlet port and to the stem end of the cylinder, a conduit connecting the outlet port to the other end of the cylinder, the discharge port being vented, an input member, differential means connecting the input member to the piston stem and the valve spool such that movement of the input member equals a constant times movement of the stem plus a constant times movement of the spool, and an output member connected to and moving with the valve spool.

References Cited in the file of this patent

UNITED STATES PATENTS

| 1,119,324 | Sprater | Dec. 1, 1914 |
| 1,959,786 | Hodgkinson | May 22, 1934 |
| 2,935,138 | Joly | May 3, 1960 |

FOREIGN PATENTS

| 261,827 | Italy | Dec. 19, 1928 |